Figure 1:
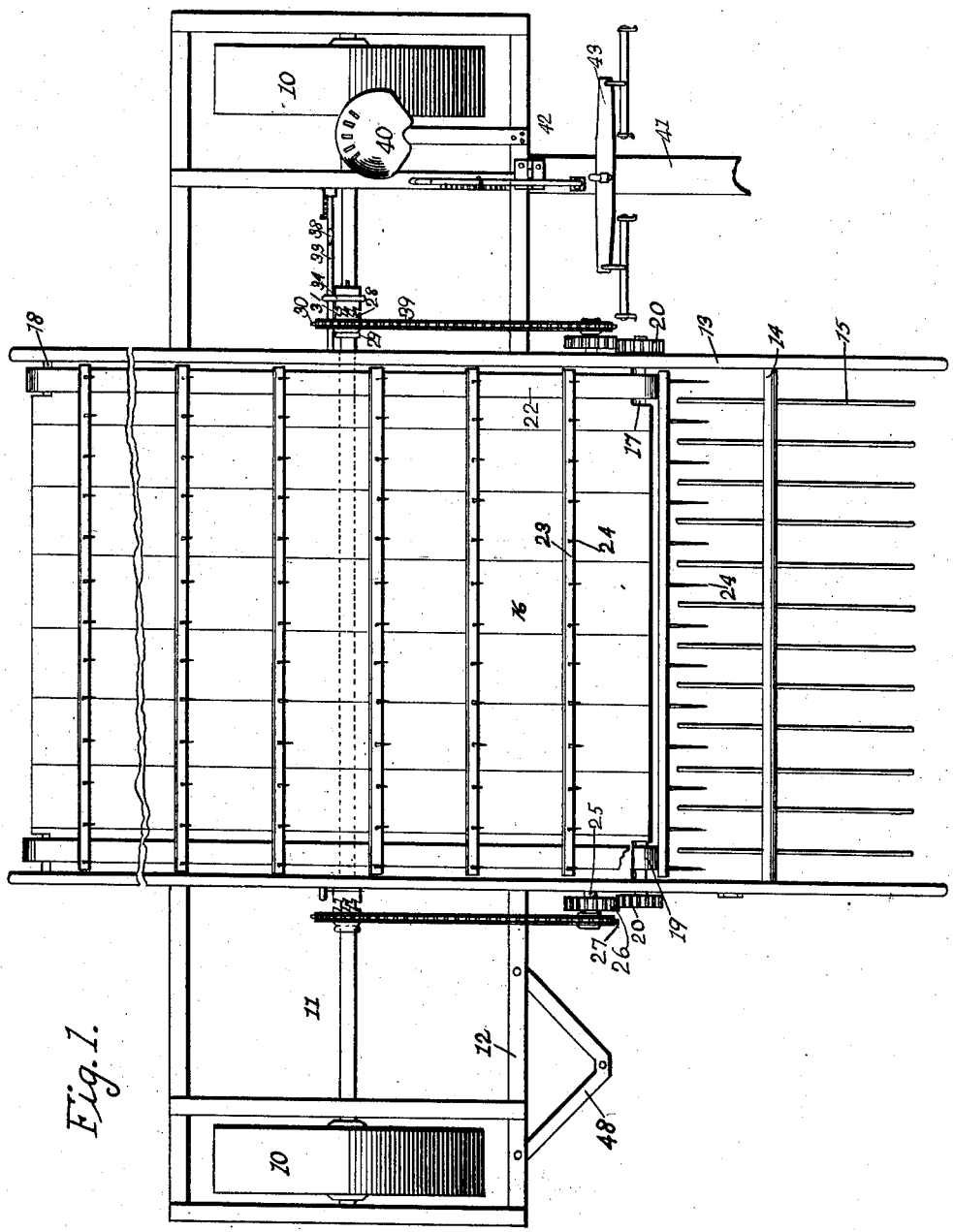

No. 757,303. PATENTED APR. 12, 1904.
R. HAWKINS.
HAY AND SHOCKED GRAIN LOADER.
APPLICATION FILED MAY 4, 1903.
NO MODEL. 2 SHEETS—SHEET 1.

Witnesses.
K. K. Keffer.
C. G. Hague.

Inventor, Roy Hawkins.
by Irwin & Lane Attorneys.

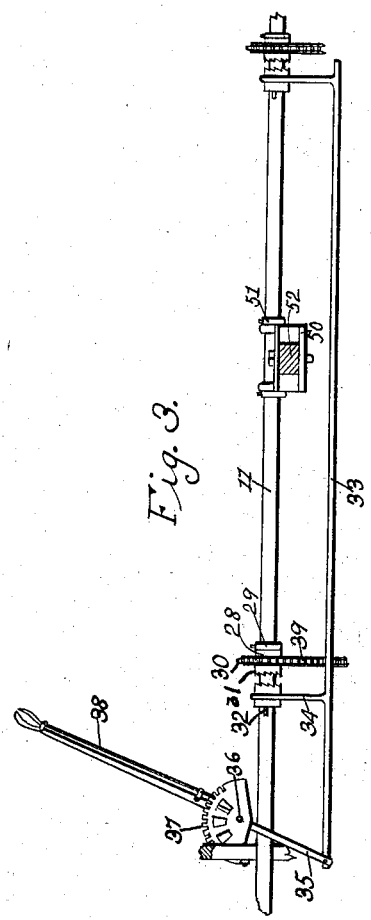

No. 757,303. Patented April 12, 1904.

UNITED STATES PATENT OFFICE.

ROY HAWKINS, OF FONDA, IOWA.

HAY AND SHOCKED-GRAIN LOADER.

SPECIFICATION forming part of Letters Patent No. 757,303, dated April 12, 1904.

Application filed May 4, 1903. Serial No. 155,555. (No model.)

*To all whom it may concern:*

Be it known that I, ROY HAWKINS, a citizen of the United States, residing at Fonda, in the county of Pocahontas and State of Iowa, have invented certain new and useful Improvements in Hay and Shocked-Grain Loaders, of which the following is a specification.

This invention relates to that class of hay and shocked-grain loaders in which the machine is advanced over the ground-surface by draft-animals, and hay arranged in windrows, or shocked bundles of grain, are picked up by the machine during its advance over the ground and deposited in a wagon advanced with the machine.

My objects are, first, to provide a machine of this class that will be of simple, durable, and inexpensive construction.

A further object is to provide a machine of this class in which the use of movable gathering-arms and like devices for picking up bundles of grain is dispensed with, so that there is no danger of the machine becoming caught or entangled with bundles of grain.

A further object is to provide a machine of this class in which there will be no side draft and in which the draft-animals may be controlled easily and without danger of throwing the bundles of grain or the hay upon the ground after they have once been carried upwardly by the conveyer.

A further object is to provide simple and easily-operated means for controlling the movements of the conveyer.

My invention consists in certain details in the construction, arrangement, and combination of the various parts of the device, whereby the objects contemplated are attained, as hereinafter more fully set forth, pointed out in my claims, and illustrated in the accompanying drawings, in which—

Figure 1 shows a top or plan view of the complete machine. Fig. 2 shows a side elevation of same with parts broken away to show certain details of construction. Fig. 3 shows an enlarged detail view, illustrating the means for controlling the movements of the conveyer; and Fig. 4 shows a detail perspective view of the means for coupling the wagon-tongue to the machine.

Referring to the accompanying drawings, I have used the reference-numeral 10 to indicate the traction-wheels of the machine. These wheels are fixed to the axle 11, and a frame 12 supports the said axle and the wheels and extends transversely of the machine-frame. In the central portion of the frame 12 two side pieces 13 are fixed, projecting some distance in advance of the frame 12 and also beyond the rear, at an angle of about forty-five degrees. The forward ends of the said side pieces are pointed and are designed to run close to the ground-surface. Near the forward end portion of these side pieces 13 is a cross-piece 14, fixed in position between the side pieces and preferably made of a hollow tube, and in this tube I have supported a series of straight teeth 15, spaced at equal distances apart, running parallel with the side pieces 13, their forward ends projecting forwardly to a point almost in line with the forward end of the side pieces 13 and the rear ends projecting some distance beyond the tube 14. By this means the said rods 15 are firmly supported and are separated at their rear ends. Immediately in the rear of the bars 15 is a solid bottom 16, fixed between the sides 13 and extending to the rear upper end of the said side pieces. Mounted beneath the forward end of the bottom 16 is a shaft 17, and mounted beneath the rear end of the bottom 16 is a similar shaft 18. On the forward shaft 17 I have fixed two pulleys 19 near the ends of the shaft and between the side pieces 13 and on the ends of said shaft. Outside of the side pieces I have fixed the pinions 20. On the shaft 18 are the loosely-mounted pulleys 21, and belts 22 are passed around these pulleys and run longitudinally of the side pieces 13, traveling upwardly and rearwardly over the bottom and returning beneath the bottom. To these belts I have fixed the cross-piece 23, each of which is provided with a series of teeth 24, said teeth being arranged to move upwardly at the forward end, between the rods 15, as clearly shown in Fig. 1.

Mounted upon the side pieces 13 immediately in the rear of the shaft 17 are the short shafts 25. Each of said shafts is provided with a pinion 26 and a sprocket-wheel 27, fixed to each other and rotatable on the shaft, the pinions 26 being in mesh with the pinions 20.

Mounted upon the axle 11 at the outer sides of the side pieces 13 are the hubs 28, rotatable on the axle 11 and held against longitudinal movement by the collars 29. Each of said hubs has a sprocket-wheel 30 formed thereon, and a ratchet-face 31. Adjacent to each of the ratchet-faced hubs is a sliding clutch member 32, mounted upon axle 11 and designed to engage the ratchet-face 31 of the hub. These clutch members 32 are moved in unison to and from engagement with the ratchets 31 by means of a rod 33, connected by the arms 34 with the sliding clutch members 32, and said rod 33 is moved by means of a lever 35, pivoted at 36 to a part of the machine-frame, and this lever is held in position by means of a sector 37, fixed to the machine-frame, and a pawl 38, pivoted to the lever 35 to engage the said sector 37. The sprocket-wheels 30 are connected with the sprocket-wheels 27 by means of the sprocket-chains 39. In practical use with this portion of the device the axle 11 is rotated during the advance of the machine and the clutch devices 32 are rotated with it. When it is desired to drive the conveyer, consisting of the belts 22 and cross-pieces 23, the operator simply moves the lever 35, as required to throw the clutches 32 into engagement with the hubs 28, whereupon the conveyer is driven in the proper direction by means of the gearing devices just described, which may be readily and quickly rendered inoperative by a reverse movement of the lever.

The reference-numeral 40 indicates a driver's seat mounted upon frame 12 adjacent to the lever 35. Immediately in front of the seat 40 is the tongue 41, connected with frame 12 by means of a hinge 42. Fixed to the tongue is the doubletree 43, and I have provided means whereby the frame 12 may be tilted as follows:

The numeral 44 indicates a lever fulcrumed to the frame 12, and a link 45 connects the lever with the tongue in front of its hinged point.

The numeral 46 indicates a sector fixed to the frame 12, and a bolt 47, connected with the lever 44, engages the sector, so that the lever may be held in any position in which it may be placed. Obviously by moving this lever forwardly and backwardly the operator may tilt the frame relative to the tongue, thus bringing the forward ends of the side pieces 13 to any desirable distance from the ground.

Fixed to the frame 12 on the side opposite from the tongue 41 is a bracket 48, to which a second team of draft-animals may be attached, and the numeral 49 indicates an upright rein-guide fixed to the side piece 13 opposite from the driver's seat, through which the reins may be passed for driving the team of draft-animals on the side opposite from the operator.

The reference-numeral 50 indicates a bracket loosely mounted upon the central portion of axle 11 and held against longitudinal movement on the axle by the collars 51. This bracket is designed to admit the forward end of the tongue 52, connected with a wagon 53, into which shocked grain or hay is to be deposited.

In practical use and assuming that it is desired to load shocked grain into a wagon, the wagon to be loaded is first driven up to the rear of the machine. The draft-animals are detached therefrom and are hitched to the bracket 48. Then the tongue of the wagon is fixed to bracket 50 and the machine is ready for operation. As the machine advances over the ground-surface the driver on seat 40 may readily control both pair of draft-animals, and in this way all side draft on the machine is prevented and the pairs of draft-animals advance over the field on opposite sides of the shocked grain. The side pieces 13 are adjusted so as to travel quite close to the ground-surface, and obviously when a shock of grain is engaged the bars 15 will pass under the shock and the shock will fall rearwardly upon the said bars and the bottom 16. Obviously the said bars will pick up bundles of grain that may be lying on the ground at the side of the shock. Hence no gathering-arms are necessary or desirable. The teeth on the cross-pieces 26 pass upwardly between the bars 15 and engage the bundles of grain, and obviously carry them upwardly and and rearwardly, and the said bundles are discharged into the wagon 53 at the rear of the machine. The driver of the wagon may arrange the bundles on the wagon as desired, because the operator of the machine may handle both teams of draft-animals, and when the wagon is completely filled the team of draft-animals hitched to the bracket 48 are unhitched therefrom and hitched to the wagon, which is then driven off the field, and the second wagon is connected with the machine in the same manner. Hay is loaded upon the wagon in substantially the same way.

Having thus described my invention, what I claim, and desire to secure by Letters Patent of the United States therefor, is—

1. In a machine of the class described, the combination of an axle, a traction-wheel fixed to each end thereof, a frame supported by the axle, a tongue pivoted to one side of the frame, means for connecting draft-animals to the other side of the frame, means for adjusting the frame relative to the tongue, side pieces fixed to the central portion of the frame and extended parallel with the traction-wheels, stationary rods fixed between the forward ends of the side pieces and a conveyer extending from the rear of the stationary rods upwardly and rearwardly to a point of discharge, and means for driving said conveyer from the axle of the traction-wheels, for the purposes stated.

2. In a machine of the class described, the combination of an axle, traction-wheels fixed to the ends thereof, a frame mounted upon said axle, a tongue hinged to the frame at one side, means for adjustably securing the frame relative to the tongue, means for securing a pair of draft-animals to the opposite side of the machine-frame, two side pieces extended parallel with the traction-wheels and fixed to the central portion of the said frame, a cross-bar between the forward ends of the side pieces, rods fixed to said cross-bar and running parallel with the side pieces, a solid bottom between the side pieces, a toothed conveyer passing over the solid bottom, the teeth thereof moving upwardly between the said rods at the front of the platform, and means driven by the axle 11 for operating the said conveyer.

3. In a machine of the class described, the combination of an axle, traction-wheels fixed to the ends thereof, a frame mounted upon said axle, a tongue hinged to the frame at one side, means for adjustably securing the frame relative to the tongue, means for securing a pair of draft-animals to the opposite side of the machine-frame, two side pieces extended parallel with the traction-wheels and fixed to the central portion of the said frame, a cross-bar between the forward ends of the side pieces, rods fixed to said cross-bar and running parallel with the side pieces, a solid bottom between the side pieces, a toothed conveyer passing over the solid bottom, the teeth thereof moving upwardly between the said rods at the front of the platform, and means driven by the axle 11 for operating the said conveyer, and a bracket fixed to the central portion of the said axle and designed to receive a wagon-tongue.

4. In a device of the class described, the combination of an axle, two traction-wheels fixed to the opposite ends thereof, a frame 12 mounted on the axle, a tongue hinged to the frame, means for adjustably securing the frame relative to the tongue, a bracket fixed to the frame at the side opposite from the said tongue, side pieces 13 fixed to the central portion of the said frame, a solid bottom between the side pieces extending to a point near their forward ends, a cross-piece fixed between the side pieces, rods 15 fixed in said cross-pieces, a shaft beneath the forward end of the said solid bottom, an endless conveyer having cross-pieces 23 and teeth 24 driven by said shaft, pinions 20 fixed to the ends of said shaft, a short shaft fixed to the side pieces adjacent to the said pinions, a pinion and a sprocket-wheel on each of said short shafts, said pinions on the short shafts being in mesh with the other pinions, two ratchet-faced hubs each having a sprocket-wheel thereon rotatably mounted upon the axle, sprocket-chains connecting the said sprocket-wheels with the sprocket-wheels on the short shafts, two clutch devices slidingly mounted on the axle, means for simultaneously throwing them in engagement with the ratchet-faced hubs, and a bracket mounted upon the central portion of the axle designed to receive a wagon-tongue, substantially as and for the purposes stated.

ROY HAWKINS.

Witnesses:
F. HAMILTON BOND,
E. L. GILSON.